United States Patent [19]

Dal Degan et al.

[11] Patent Number: 4,688,224
[45] Date of Patent: Aug. 18, 1987

[54] METHOD OF AND DEVICE FOR CORRECTING BURST ERRORS ON LOW BIT-RATE CODED SPEECH SIGNALS TRANSMITTED ON RADIO-COMMUNICATION CHANNELS

[75] Inventors: Neviano Dal Degan, S. Mauro Torinese; Fulvio Rusiná, Cirié, both of Italy

[73] Assignee: CSELT - Centro Studi e Labortatori Telecomunicazioni SpA, Turin, Italy

[21] Appl. No.: 766,754

[22] Filed: Aug. 16, 1985

[30] Foreign Application Priority Data

Oct. 30, 1984 [IT] Italy ................................ 68078 A/84

[51] Int. Cl.$^4$ .......................... G06F 11/00; G10L 1/00
[52] U.S. Cl. .......................................... 371/31; 381/46; 381/47
[58] Field of Search ..................... 371/31, 65; 381/46, 381/47, 41, 42, 43, 44, 45, 48, 49, 50

[56] References Cited

U.S. PATENT DOCUMENTS

| | | | |
|---|---|---|---|
| 4,158,749 | 6/1979 | Deman | 381/46 |
| 4,331,837 | 5/1982 | Soumague | 381/46 |
| 4,357,491 | 11/1982 | Daaboul | 381/46 |
| 4,531,228 | 7/1985 | Noso | 381/46 |
| 4,535,473 | 8/1985 | Sakata | 381/46 |
| 4,593,392 | 6/1986 | Kouyama | 371/31 |

*Primary Examiner*—Michael R. Fleming
*Attorney, Agent, or Firm*—Karl F. Ross; Herbert Dubno

[57] ABSTRACT

In a radio transceiving system of low bit-rate coded speech signals, to be installed on mobiles, the method allows the detection and correction of burst error present in the demodulated coded signal, in the receiver.

This method allows error detection by distance measurements among the values of the decoded parameters in subsequent intervals and, in case of error, to substitute values obtained with linear-interpolation techniques for the erroneous parameters.

14 Claims, 5 Drawing Figures

METHOD OF AND DEVICE FOR CORRECTING BURST ERRORS ON LOW BIT-RATE CODED SPEECH SIGNALS TRANSMITTED ON RADIO-COMMUNICATION CHANNELS

FIELD OF THE INVENTION

The present invention concerns radio transceiving systems for coded speech signals, installed on mobiles and in particular it relates to a method of and a device for the correction of burst errors on low bit-rate coded speech signals transmitted on radio communication channels.

BACKGROUND OF THE INVENTION

The main requirements of a radio transceiving apparatus, to be installed on board mobiles, such as aircrafts, small boats, motor vehicles, are low cost and small size.

To satisfy such requirements, the used antennas, being simple and fixed, have low directivity and hence they receive, in addition to the main signal directly arriving from the transmitter or from the repeater, multipath signal reflected by the earth surface or other various fixed or mobile obstacles.

Since the antenna is installed on board a mobile, or owing also to the same earth surface motion (e.g. sea-waves), in certain instantaneous positions of the mobile, undesired reflected signals sum up together degrading the main signal and giving rise to a resultant signal whose level, for short time intervals, can drop below the correct-reception threshold of the receiver thus originating a burst noise in the decoded signal. This effect is known in the art as "multipath fading".

Coding devices known in the art as vocoders are usually used for speech-signal transmission on low bit-rate channels (up to 4.8 kbit/s).

Said devices analyze the speech signal at intervals, whose typical length is nearly 20 ms, extracting for each interval a set of parameters which is then transmitted at low bit-rate, usually at 2.4 kbit/s. In reception on the contrary such devices use received and decoded sets of parameters and reconstruct the original speech-signal.

According to typical "fading" duration (99% probability that it is shorter than 22.5 ms), the mobile vocoder receiver can receive one set of erroneous parameters, if the burst noise falls within an interval, or two consecutive sets of erroneous parameters, if burst noise spans two consecutive intervals.

To correct the erroneous parameters, two known techniques could be used.

The first known technique uses a self-correcting code for encoding the parameters in transmission.

Such codes however introduce high redundancy in transmitted data, i.e. a high transmitted-data/actual-data ratio.

In this case, to use the same vocoder (e.g. 2.4 kbit/s Vocoder), transmission bit-rate ought to be greatly increased, what cannot be achieved without reaching or furthermore exceeding maximum bandwidth available to each transmission channel. In the alternative, transmission bit-rate could be kept standard (e.g. 2.4 kbit/s), by using a lower bit-rate vocoder, which however would be much more complex and expensive, and of a lower transmission quality. Hence such a vocoder could not be used in our case.

The second known technique, described e.g. in the paper entitled "Vocoder speech through fading channels", B. Gold., J. Lynch, J. Tierney, ICASSP '83 conference, held in Boston, consists of requesting retransmission of parameters taken as erroneous by the receiver.

According to this technique, during the whole retransmission time, the vocoder of the mobile receiver generates no output signal, and recovers time spent waiting for correct parameters by speeding up the speech synthesis process in the subsequent intervals, thus introducing an artificial time compression of the reproduced speech.

This second method cannot be applied in geostationary satellite communications since, as the total path covered by transmitted waves is long, the delay introduced in case of retransmission would be too high. In fact the mean delay for a geostationary satellite communication is 270 ms; each retransmission would take at least 540 ms; for a 2.4 kbit/s vocoder that would mean 24 consecutive silence intervals, to be afterwards recovered, with consequent excessive degradation of speech reproduction quality.

In direct transmission systems, on the contrary, this technique is theoretically applicable, as the path covered by the transmitted waves is short and then the delay introduced in case of retransmission is not considerable. Yet from the implementation standpoint, considerable complications would be introduced in the structure of receiving and transmitting apparatus.

In addition the retransmission technique could not obviously be applied in the case in which the apparatus installed on board the mobile would comprise the only receiving side.

These problems are solved by the present invention of a method of and a device for correcting burst errors on low bit-rate coded speech signals, transmitted on radio communication channels, which does not require retransmission in case of error and does not utilize self-correcting codes for data encoding, but detects in the mobile receiver the presence of transmission errors due to burst noise by distance measurements between the values assumed by speech parameters in consecutive intervals, and, in case of error, substitutes parameters obtained with linear interpolation techniques for the parameters taken as erroneous.

OBJECTS OF THE INVENTION

It is particular object of the present invention the method described in claim 1.

It is another object of the present invention the device for implementing the method, described in claim 8.

SUMMARY OF THE INVENTION

The method provided by the present invention is mainly based on the detection of burst noise and on the substitution of sets of parameters locally generated by linear interpolation techniques for the sets of parameters altered by said noise.

The detection of burst noise condition is obtained by measuring at each interval the distance between the parameters corresponding to present and preceding intervals (intervals indicated respectively by indices n, n−1); what is meant by distance will be explained later.

If the distance exceeds a threshold, an error is hypothized in the reception of the parameters of present interval n. This hypothesis is correct, because in most cases the variations of parameter values at contiguous intervals are small.

Then a signal indicative of the quality of received signal in the same intervals is considered.

If this signal is indicative of good quality transmission during interval n, the parameters of interval n are anyhow considered as correct; in fact in speech generation process there exist actual sharp transitions in parameter values, in correspondence with the beginning of plosive sounds, comparatively rare.

Without this further comparison, said actual transitions would be considered as erroneous.

If on the contrary said signal indicates bad reception quality during interval n, the distance between the parameters of the two subsequent intervals n+1, n+2 is computed; if this new distance is lower than the threshold, the burst noise is considered as occurred in the only interval n, whose parameters are replaced by locally computed ones; if, on the contrary, this new distance value exceeds the threshold, the signal indicating reception quality is considered again in correspondence with the interval n+1: if this signal indicates good reception quality, the burst noise is considered also in this case as present only in interval n, as above; if, on the contrary, the signal indicates bad reception quality even during interval n+1, that means that burst noise spans two consecutive intervals n, n+1, whose parameters are replaced by the locally generated ones.

The measurement of the distance between corresponding parameters of subsequent intervals is, in a non-limiting example, the measurement of the spectral distance, which uses the subset of reflection coefficients $K_i(n)$ with $1 \leq i \leq M$, where M is the number of reflection coefficients used in the signal analysis. Such coefficients characterize in an interval n the shape of the spectrum of the speech signal. The set of parameters consists of reflection coefficients $K_i(n)$, gain $G(n)$ and pitch $P(n)$.

Spectral-distance measurement is carried out as follows:

the following non linear transformation $AR_i(n)$ is applied to each reflection coefficient $K_i(n)$ at each interval:

$$AR_i(n) = \frac{1 + K_i(n)}{1 - K_i(n)} \quad (1)$$

the value of spectral distance $DS(n)$ is calculated for interval n by the following expression:

$$DS(n) = \frac{1}{10} \sum_{i=1}^{M} 20 \left| \log \frac{AR_i(n)}{AR_i(n-1)} \right| \quad (2)$$

the value $DS(n)$ is then compared with threshold value $DS_{TH}$.

According to the method above, in the case in which the signal indicating reception-quality denotes for interval n a bad reception, equations (1) and (2) are computed also for the parameters of intervals n+1, n+2, substituting into said equations the values of interval n+2 for those of interval n, and values of intervals n+1 for those of interval n−1.

The substitution of the parameters taken as erroneous is carried out as follows:

(a) if the erroneous parameters are those of a single interval, e.g. the n-th, they are replaced by the following set of values:

$$Ki(n) = \frac{K_i(n-1) + K_i(n+1)}{2} \quad (3)$$

$$G(n) = \frac{G(n-1) + G(n+1)}{2} \quad (4)$$

$$P(n) = \frac{P(n-1) + P(n+1)}{2}, \text{ if } P(n-1), P(n+1) \neq 0 \quad (5)$$

$$P(n) = P(n-1), \text{ if } P(n-1) \neq 0, P(n+1) = 0 \quad (6)$$

$$P(n) = P(n+1), \text{ if } P(n-1) = 0, P(n+1) \neq 0 \quad (7)$$

$$P(n) = 0 \text{ if } P(n-1) = P(n+1) = 0 \quad (8)$$

i.e. the parameters of the n-th interval are given by the mean value of those of the two adjacent intervals, except in the particular cases indicated for P(n);

(b) if the erroneous parameters are those of two consecutive intervals, e.g. n, n+1, they are replaced by the following sets of values:

$$\left. \begin{array}{l} K_i(n) = K_i(n-1) \\ G(n) = G(n-1) \\ P(n) = P(n-1) \end{array} \right\} \quad (9)$$

$$\left. \begin{array}{l} K_i(n+1) = K_i(n+2) \\ G(n+1) = G(n+2) \\ P(n+1) = P(n+2) \end{array} \right\} \quad (10)$$

i.e. the parameters of interval n−1 are extended to the subsequent interval n, and those of interval n+2 to the preceding interval n+1.

As a variant to the method above, substitution (b) can be used also in the case in which the erroneous parameters are those of a single interval; said erroneous parameters are replaced either by those of the preceding interval, or by those of the subsequent interval.

This alternative method is a simplification of procedure, and hence of device, leading however to less accuracy of the prediction process.

BRIEF DESCRIPTION OF THE DRAWINGS

A non-limiting example of embodiment is now described, of a device for implementing the method of the invention, with reference to the annexed drawings in which.

SPECIFIC DESCRIPTION

Figure 1:
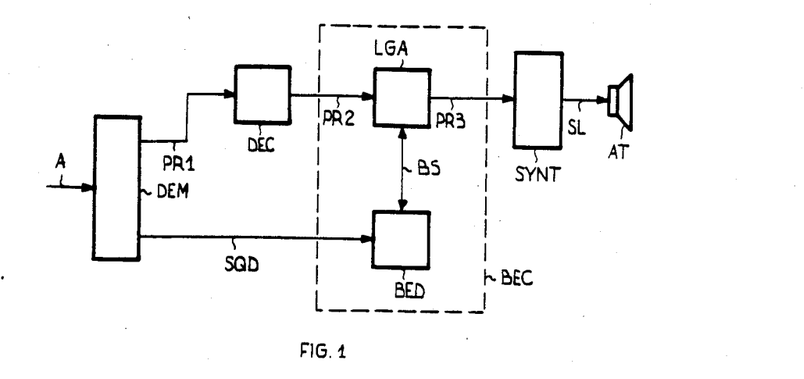
FIG. 1 is a general block diagram showing the insertion of the device, provided by the present invention, into a known receiver.

In FIG. 1 DEM denotes the demodulating section of the known modem present in mobile apparatus. Signal A, received through the antenna after suitable frequency conversion, is applied to DEM input, and the demodulated digital signal, consisting of the sequence of sets of coded parameters and of synchronisms is present at DEM output on bus PR1.

As mentioned above, the modem is of known type, capable of supplying, on an auxiliary output SQD of the receiving section, a signal indicating the quality of the signal received at the input, in accordance with CCITT recommendations V.24.

Circuit blocks downstream block DEM form the receiving side of the vocoder installed on board the mobile. Said receiving side, usually consisting of blocks DEC and SYNT, is modified in accordance with the present invention by the addition of circuit blocks contoured in FIG. 1 by dashed line BEC.

Block DEC performs the known function of decoding and inverse quantizing of parameters received on bus PR1, and reemitted on bus PR2 under parallel form, together with the the synchronism signal.

Burst error correcting circuit BEC consists of blocks LGA and BED.

LGA indicates a block for implementing the above-described algorithm for the local generation of parameters. LGA receives the parameters from decoder DEC through bus PR2 and during burst-noise-affected intervals emits on bus PR3 sets of parameters calculated according to the formulae of modes (a) or (b) of the method; on the contrary, during noise-unaffected intervals, it emits the parameters received. The insertion of block LGA introduces a 3-interval delay on the received signal.

On bus BS, LGA exchanges with block BED parameter values and control signals.

Figure 2:
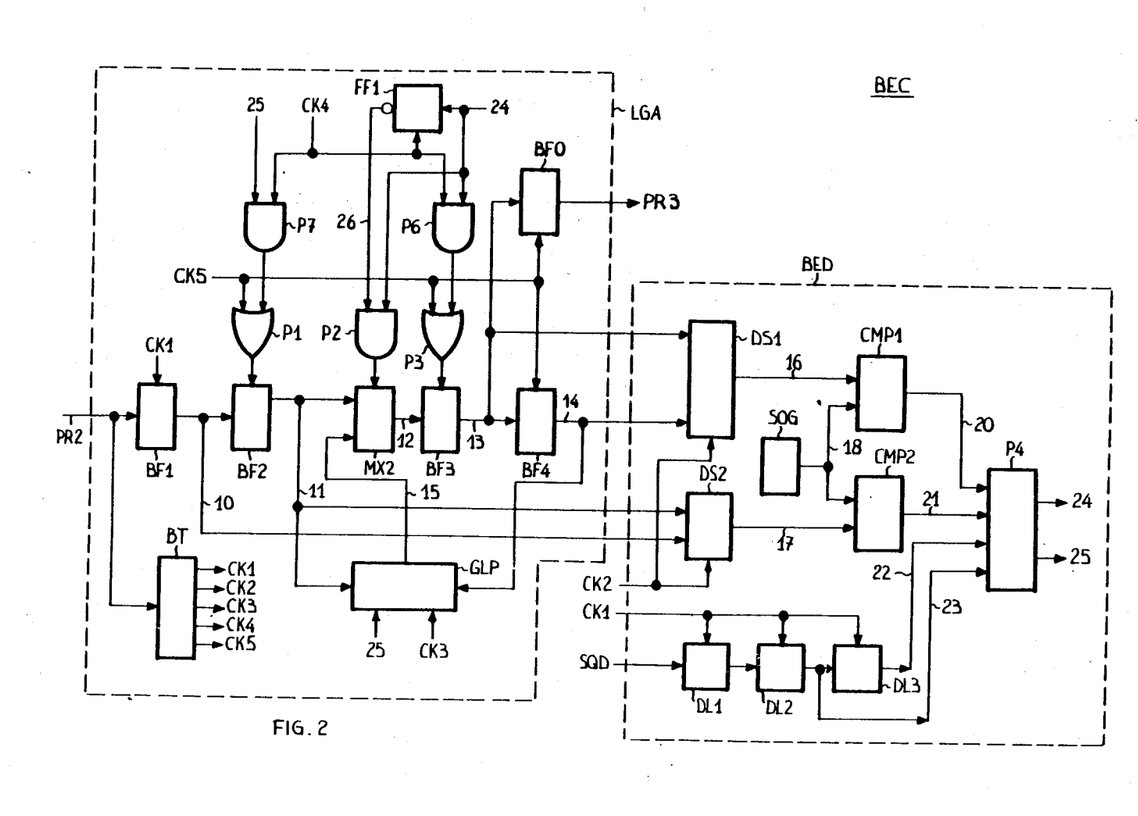
FIG. 2 is a detailed block diagram of the device provided by the invention.

The structure of block LGA will be examined in detail with reference to FIG. 2.

BED denotes a circuit block for implementing the algorithm of detection of burst-error condition described above.

Block BED receives signal SQD from block DEM and the values of duly delayed parameters on bus BS from LGA and emits on bus BS control signals determining the transfer on bus PR3 by LGA of the parmeters present on bus PR2 or of parameters generated by LGA.

The structure of block BED will be examined in detail with reference to FIG. 2.

Bus PR3 is connected to the input of block SYNT, whose structure is well known; SYNT is the speech synthetizer of the vocoder and supplies at the output on wire SL the synthetized speech signal converted into analog form, to loudspeaker AT.

In FIG. 2, BF1, BF2, BF3, BF4 denote four conventional buffer registers; BF2, BF3, BF4 act as delay line, each of a time period equal to an interval, for the sets of parameters carried to their inputs.

Each of said registers is composed of so many cells, as are the wire of the respective input buses.

The sets of parameters directly arrive at register BF1 from block DEC (FIG. 1) through bus PR2.

The parameters present on bus PR2 pass onto bus 10 of BF1 output and BF2 input, when the logic level of signal on wire CK1, applied to the clock input of BF1, goes to 1.

The parameters present on bus 10 pass onto bus 11 connected to the output of BF2 and to an input of multiplexer MX2, when the logic level of the output of an OR gate P1, applied to the clock input of BF2, goes to "1".

MX2 output is applied to the input of register BF3 through bus 12.

When the logic level of the output of OR gate P3, applied to the clock input of BF3 goes to "1", the parameters present on bus 12 pass into bus 13 of output of BF3 and input of BF4.

When the logic level of the signal on wire CK5, applied to the clock input of BF4, goes to "1", the parameters present on bus 13 pass onto output bus 14 of BF4.

GLP denotes a circuit block for implementing the computing algorithm of the parameters for replacing those taken as erroneous. GLP receives the parameters present on buses 11 and 14 and supplies the computed parameters on bus 15 applied to the second input of multiplexer MX2.

GLP is activated at each interval by the signal on wire CK3 and receives the signal on wire 25, whose logic level indicates whether two intervals or only one are affected by error.

An example of embodiment of block GLP will be described in connection with FIG. 4.

DS1 and DS2 indicate two equal circuit blocks for computing the distances between the parameters. DS1 receives the parameters present on buses 13 and 14, while DS2 receives those present on buses 10 and 11. DS1 and DS2 are activated at each interval by the signal on wire CK2 and emit the calculated distance values respectively on buses 16 and 17. An example of embodiment of block DS1 will be described in connection with FIG. 5.

CMP1, CMP2 denote two usual majority comparators which compare the distance values present respectively on buses 16 and 17, with a threshold value present in the memory SOG and supplied through bus 18. The result of the comparisons effected is supplied to block P4 by CMP1 through wire 20, and by CMP2 through wire 21.

The high logic level on wires 20 or 21 indicates that the threshold has been exceeded.

DL1, DL2, DL3 are three equal conventional 1-cell registers forming a 3-interval delay line, for signal SQD coming from modem DEM (FIG. 1). Said registers are synchronized by clock signal on wire CK1.

Signal SQD is applied to DL1 input; DL1 output is connected to DL2 input, whose output is in turn connected to DL3 input. DL2 and DL3 outputs are connected to two inputs of block P4 through wires 23 and 22 respectively. In this example the logic level "1" of signal SQD indicates bad quality of the signal received, while level "0" indicates good quality.

Block P4 consists of a combinatory logic emitting an active logic level on a first output connected to wire 24 when the levels of signals over input wires 20 and 22 are active and emitting an active logic level on a second output connected to wire 25 when all its input logic levels are active.

Block P4 can e.g. consist of three two-input AND gates: the first gate has the inputs connected to wires 20, 22 and the output to wire 24; the second gate has the inputs connected to wires 21, 23 and the output connected to an input of the third gate; the third gate has a second input connected to the output of the first gate and the output connected to wire 25.

At a determined n-th interval the active level on wire 24 indicates that this interval is affected by burst noise, while the active level on wire 25 indicates that the n-th interval and the subsequent one are affected by said noise.

Wire 24 is connected to an input of AND gates P2, P6 and to the input of D-flip-flop FF1, while wire 25 is connected to an input of AND gate P7 and of block GLP. Clock signal on wire CK4 is applied to the second input of gates P6 and P7, as well as to the clock input of flip-flop FF1; the complemented output of FF1 is connected to the second input of gate P2.

The output of gate P6 is connected to an input of gate P3, while the output of gate P7 is applied to an input of gate P1. The clock signal on wire CK5 is connected to the second input of gates P1, P3.

Block BF0 indicates a parallel buffer register, which comprises as many cells as are the wires of bus 13 applied to the input; said register, when activated by signal on wire CK5 applied to the clock input, transfers the data present on bus 13 to output bus PR3, which is also the output bus of the device provided by the invention.

Block BT acts as a time-base and generates clock signals on wires CK1, CK2, CK3, CK4, CK5, on the basis of the synchronism signal it receives from bus PR2.

Figure 3:
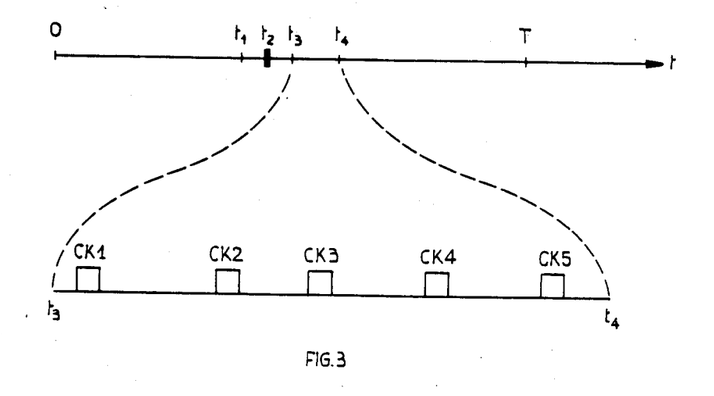
FIG. 3 shows the trend in time of signals emitted by block BT of FIG. 2.

The implementation of block BT is not a problem to the skilled in the art, once he knows clock signal time-trend shown in FIG. 3.

In FIG. 2 blocks DS1, DS2, SOG, CMP1, CMP2, P4, DL1, DL2, DL3 compose error detecting block BED shown in FIG. 1, while the other blocks compose parameter generating block LGA shown in FIG. 1.

Wires CK1, CK2, 24, 25 and buses 10, 11, 13, 14 constitute bus BS shown in FIG. 1.

In FIG. 3, on time axis t, a time period (0 to T) equal to an interval is plotted. The vocoder of the mobile operates at each interval as follows:

in period $0-t_2$ it works in transmission and analyses (period $0-t_1$) and then encodes (period $t_1-t_2$) speech signal;

during period $t_2-T$ it works in reception and decodes the parameters received (period $t_2-t_3$: task carried out by block DEC in FIG. 1); it corrects erroneous parameters (period $t_3-t_4$: task carried out by block BED of FIG. 1); it synthesises speech parameters (period $t_4-T$: task carried out by block SYNT of FIG. 1).

In FIG. 3 period $t_3-t_4$ is expanded. During this period pulses of clock signals on wires CK1, ... CK5 are generated by BT; hence at each interval each clock signal has a pulse delayed, with respect to the preceding pulse, by a time sufficient to allow stabilization of the logic levels of the signals generated on the basis of the preceding pulse, so as to avoid superposition of undesirable effects.

Figure 4:
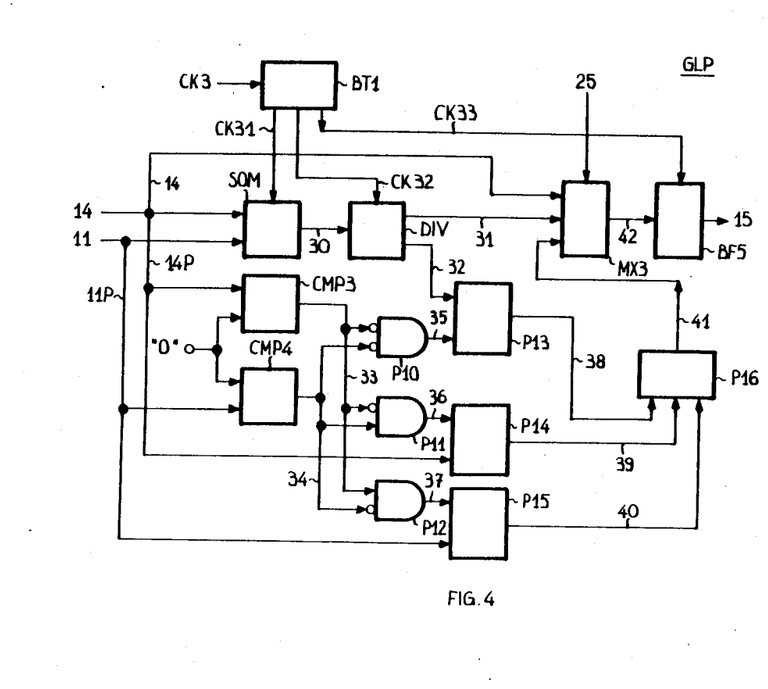
FIG. 4 shows a circuit embodiment of block GLP of FIG. 2.

In FIG. 4 SOM denotes an ordinary adder, to whose inputs buses 14 and 11 coming from the outputs of registers BF4 and BF2 (FIG. 2), respectively, are applied. SOM adds up corresponding values of the parameters present at the inputs and supplies the results on output bus 30 towards the input of block DIV, which is an ordinary divider by two of the parameter sums.

The division results obtained for parameters $K_i(n)$ and $G(n)$ are supplied on bus 31, while that relevant to parameter $P(n)$ is supplied on bus 32.

Blocks SOM and DIV are synchronized by clock signals CK31 and CK32 respectively.

BT1 is a local time-base synchronized by clock signal on wire CK3, it receives from BT (FIG. 2), and orderly emits clock signals CK31, CK32, CK33 duly delayed, for synchronising the operations carried out by blocks SOM, DIV, and BF5 respectively.

BT1 is basically of the type of BT and its embodiment is not a problem for the person skilled in the art.

CMP3 and CMP4 are two equality comparators comparing logic value "0" respectively with the values of parameter $P(n-1)$, extracted from bus 14 through bus 14P, and of parameter $P(n+1)$, extracted from bus 11 through bus 11P. The comparison results are supplied by CMP3 on wire 33 and by CMP4 on wire 34. Logic level "1" on wires 33 or 34 indicates the equality condition.

P10, P11, P12 are three AND gates. Complemented values of signals on wires 33, 34 are applied to P10 inputs; the signal on wire 34 and the complemented value of signal on wire 33 are applied to P12 inputs.

The outputs of P10, P11, P12 are connected to wires 35, 36, 37 respectively.

P13, P14, P15 are three equal blocks, comprising each as many two-input AND gates as are the wires of buses 32, 14P, 11P applied to one of their inputs, respectively; wire 35 is applied to the second input of the gates of P13, wire 36 is applied to the second input of the gates of P14, and wire 37 is applied to the second input of the gates of P15.

P16 denotes a block comprising as many three-input OR gates as are the wires of buses 38, 39, 40 forming the outputs of blocks P13, P14, P15 respectively.

Corresponding wires of input buses are applied to the inputs of the gates of P16. The outputs of OR gates of P16, which form the value of $P(n)$, are applied to bus 41.

Bus 31 carrying the values of parameters $K_i(n)$ and $G(n)$, and bus 41 carrying the value of $P(n)$, compose one of the two inputs of multiplexer MX3 to whose second input bus 14 is applied. The control signal for MX3 is the signal of wire 25 whose logic level establishes the connection on bus 42, either of bus 14 or of buses 31 and 41.

Bus 42 is applied to the input of parallel buffer register BF5, consisting of as many cells as are the wires of bus 42.

When signal CK33, applied to the register clock input, takes the active logic value, data present on bus 42 are sent to the output bus 15 which is connected to an input of multiplexer MX2 (FIG. 2).

As it can be easily seen, blocks SOM and DIV perform the operations of equations (3), (4), (5), while comparators CMP3, CMP4 check the hypotheses of equations (5), (6), (7), (8). Logic gates of blocks P10 ... P16, supply on bus 41 the value of $P(n)$ given by one of equations (5), (6), (7), (8) chosen by means of the occurred hypothesis.

The hypothesis of equation (8) is automatically verified when the other three hypotheses are not verified and value $P(n)=0$ is automatically obtained since the outputs of gates P10, P11, P12 are "0".

Multiplexer MX3 chooses either the error condition in a single interval (logic "0" over wire 25), whereby the contents of buses 31 and 41 are supplied to the output, or the error condition in two intervals (logic "1" over wire 25), whereby the contents of bus 14 are supplied to the output.

Figure 5:
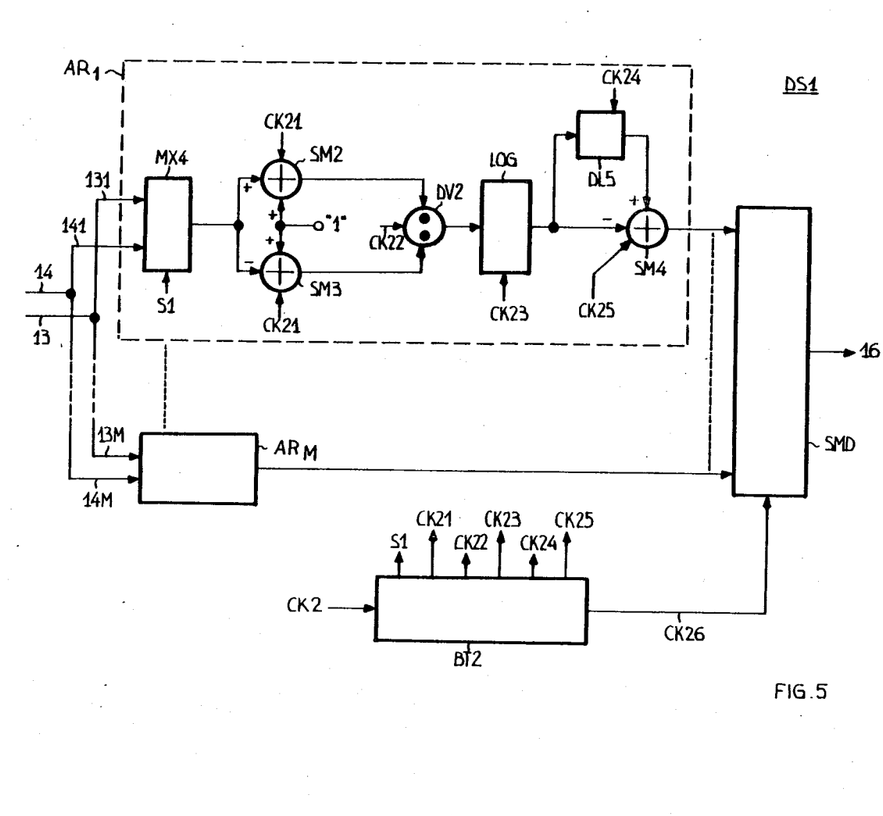
FIG. 5 shows a circuit embodiment of block DS1 of FIG. 2.

FIG. 5 shows the structure of block DS1: it comprises M equal sections $AR_1 ... AR_i ... AR_M$, as many as are parameters $K_i(n)$ coming on bus 13 from register BF3 (FIG. 2) and parameters $K_i(n-1)$ coming on bus 14 from register BF4 (FIG. 2). Sections $AR_i$ perform the homonymous functions defined in formula (1). Parameters $K_1(n)$, $K_1(n-1)$ are supplied to AR1 through buses 131 and 141, derived from buses 13 and 14 respectively, and so on for the other blocks $AR_i$, up to ARM at which parameters $K_M(n)$, $K_M(n-1)$ arrive through buses 13M, 14M, derived from buses 13, 14 respectively.

Sections $AR_i$ work in parallel and supply the operation results to block SMD.

Section $AR_1$, receiving parameters $K_1(n)$ and $K_1(n-1)$ is shown in detail inside the dasked line in the Figure.

MX4 is a conventional multiplexer which, depending on the logic level of control signal S1, supplies to the output either the contents of input bus 131 or those of input bus 141.

SM2, SM3 are two conventional adders which perform respectively the addition and the difference of input wired logic "1" and of the value supplied to the output of MX4 applied to a second input.

The obtained results are supplied to a conventional divider DV2 which affects the division between the value received from SM2 and that received from SM3, obtaining the result of the expression (1), which is sent to block LOG. The latter is a conventional circuit for computing the logarithm, expressed in dB, of the value received at the input.

The output of LOG is applied to the input of block DL5, consisting of a conventional delay circuit (time delay equal to that introduced by SM2, SM3, DV2, LOG to perform their operations) and of block SM4 consisting of an adder, whose second input is connected to the output of DL5.

The operations of blocks SM2, SM3, DV2, LOG are carried out twice; first keeping the value $K_1(n)$ and then $K_1(n-1)$ duly switched by multiplexer MX4. Finally, at the inputs of SM4 the two values computed by LOG are simultaneously present thanks to delay circuit DL5.

SM4 calculates the difference between the values supplied by the outputs of DL5 and LOG, and supplies the result at the output towards block SMD. Said result is the first term of the summation of above-mentioned expression (2).

Block SMD effects the summation of all the results coming from blocks $AR_i$ and then divides the result by 10, thus obtaining value DS(n) of expression (2) supplied at the output on bus 16 which is applied to an input of comparator CMP1 (FIG. 2).

BT2 denotes a local time-base which, when it receives the clock signal on wire CK2 from BT (FIG. 2), emits control signal S1 for MX4 and clock signals CK21, CK22, CK23, CK24, CK25, CK26 in a suitable sequence apt to control the operations of blocks $AR_i$ and SMD.

Signal CK21 is applied to blocks SM2, SM3 of each block $AR_i$; signal CK22 to blocks DV2; signal CK23 to blocks LOG; CK24 to blocks DL5; CK25 to blocks SM4; CK26 to block SMD.

The implementation of time-base BT2 is not a problem to the person skilled in the art.

Now, the operation of the device provided by the invention will be described (with particular reference to FIG. 2), during a single interval n under steady-state condition, because the device operates in the same way in all intervals.

In addition, it is assumed that the parameters of interval n be present on bus 13, since it is the bus supplying the parameters to the output of the device, on bus PR3. Under this condition on bus 14 there are the parameters of interval $(n-1)$, on bus 11 those of interval $(n+1)$, on bus 10 those of interval $(n+2)$.

At the same time signal SQD referred to interval n is present on wire 22 outgoing from block DL3, while signal SQD referred to interval $(n+1)$ is present on wire 23 outgoing from DL2.

At the beginning of interval n, the pulse of clock signal CK1 causes the transfer of parameters of interval $(n+2)$ from input bus PR2 to bus 10.

Then clock signal CK2 determines the start of the operations of blocks DS1 and DS2; DS1 calculates the spectral distance between parameters $K_i(n-1)$, present on bus 14, and $K_i(n)$ present on bus 13, while DS2 calculates the spectral distance between parameters $K_i(n+1)$, present on bus 11, and $K_i(n+2)$ present on bus 10.

Finally, the obtained spectral distance values are compared by comparators CMP1, CMP2 with the threshold present in SOG.

Taking into account the results of said comparisons and the logic levels on wires 22, 23, the outputs of P4 can take the following logic levels:

(a) logic "0" on both outputs 24, 25; that corresponds to normality conditions where the parameters of interval n have a spectral distance which is less than SOG threshold; this case corresponds to the hypothesis of a reception not-affected by burst noise during interval n, while no hypothesis is made on interval $n+1$;

(b) logic "1" at output 24, and logic "0" at output 25; that corresponds to the condition in which, during interval n the quality of the received signal is bad and spectral distance of the parameters is greater than the threshold, and hence a burst-noise-affected reception is hypothized during only interval n;

(c) logic "1" on both outputs 24, 25; that corresponds to the condition in which during intervals n, $n+1$ the received signal quality is bad and the spectral-distance of the parameters exceeds the threshold, and hence a burst-noise-affected reception is assumed during both intervals n, $n+1$.

It is worth noting that the condition of logic "0" on wire 24 and "1" on 25 cannot take place, because it would correspond to an error hypothesis during the only interval $n+1$, which hypothesis is to be emitted during the subsequent interval under text.

To conclude, the parameters of an interval are to be taken as correct if the spectral distance is less than the threshold, regardless of the level of signal SQD.

If, on the contrary, the spectral distance exceeds the threshold, parameters are considered right if signal SQD indicates good reception, or erroneous if signal SQD indicates bad reception.

The subsequent clock pulse CK3 determines the intervention of block GLP; in the above-examined case (c) GLP only supplies on bus 15 the parameters of interval $(n-1)$ present on bus 14; on the contrary in cases (a), (b) GLP supplies on bus 15 the mean value of the parameters of intervals $(n-1)$ and $(n+1)$ present on buses 14 and 11 respectively.

In the above-mentioned case (a), which is also the most frequent one, multiplexer MX2 remains switched on the input connected with bus 11, and the subsequent clock pulse CK4 has no effect on registers BF2, BF3: in fact as the signals on wires 24 and 25 are "0", also the outputs of gates P2, P6, P7 are "0" both before and after pulse CK4. The computation effected by GLP is hence ignored and at the subsequent clock pulse CK5 register BF0 sends on output bus PR3 the parameter of interval n actually received through input bus PR2 two intervals before; at the same time the parameters present on buses 10, 12, 13 pass onto buses 11, 13, 14 respectively.

At the subsequent pulse of CK1 the parameters of interval $n+3$ will pass from bus PR2 to bus 10; hence the new situation will occur of parameters of interval n+3 on bus 10, of interval n+2 on buses 11 and 12, of interval n+1 on bus 13, and of interval n on bus 14.

In case (b), as the logic level on wire 24 is changed from "0" to "1", FF1 output will be at "1" before CK4 pulse and at "0" afterwards, therefore MX2 is switched until CK4 pulse on the input connected to bus 15, whose contents, just computed by GLP, pass on bus 12. Then, upon the occurrence of pulse CK4, the output of gate P6 goes to "1" supplying BF3 with a clock pulse, and the contents of bus 13 are replaced by that of bus 12, i.e. the erroneous parameters of interval n are replaced by the values computed by GLP. On the contrary, as P7 output is "0", the contents of buses 10 and 11 remain unchanged, as BF2 has not be activated. At the same time MX2 is reswitched on the input connected with bus 11.

Upon the occurrence of pulse CK5, BF0 supplies the output with the parameters emitted by GLP; in this case the parameters are those of the equations from (3) to (8); at the same time the contents of buses 10, 12, 13 pass onto buses 11, 13, 14 respectively. After the subsequent pulse CK1, there will be the new parameter situation of interval n+3 on bus 10, of interval n+2 on bus 11 and 12, of interval n+1 on bus 13, of values computed by GLP for interval n on bus 14.

Case (c) can be referred to case (b) except what concerns register BF2; in fact, as the signal on wire 25 is now at "1", upon the occurrence of pulse CK4, the contents of bus 11 and hence of bus 12 (erroneous parameters of interval n+1) are replaced by those of bus 10 (parameters of the interval n+2). Upon the occurrence of pulse CK5, BF0 sends the parameters supplied by GLP onto the output, which parameters are in this case those of interval n−1 extracted from bus 14, and the contents of buses 10, 12, 13 pass onto buses 11, 13, 14. After the subsequent pulse CK1, the new situation will take place of parameters of interval n+3 on bus 10, of interval n+2 on buses 11, 12, 13, of interval n−1 on bus 14.

Modifications and variations can be made to the described circuit embodiment without going out of the scope of the invention.

For example, to implement the above-described variant of the method, block GLP (FIG. 2) consists of a simple parallel register, whose data input is connected with bus 14, the data output with bus 15 and the clock input with wire CK3. At each clock pulse on wire CK3, GLP supplies the contents of bus 14 on bus 15.

Another circuit variant consists of an only circuit for computing spectral distances among the parameters, instead of two circuits DS1, DS2 foreseen in FIG. 2.

In this case the single computing circuit has still a structure basically equivalent to that of block DS1 shown in FIG. 5, but its computing rate must be double, because at each interval it calculates first spectral distance DS(n) between parameters $K_i(n)$ and $K_i(n-1)$, and then the distance DS(n+1) between parameters $K_i(n+1)$ and $K_i(n+2)$. Hence multiplexers MX4 (FIG. 5) must have 4 inputs to which suitable wires of buses 10, 11, 13, 14 (FIG. 2) are connected; in addition the clock signals generated by time base BT2 must have a frequency twice that necessary for block DS1. The output of block SMD (FIG. 4) is connected to a suitable memory element, controlled by time-base BT2, which stores spectral distance values DS(n) and DS(n+1), it supplies then on buses 16 and 17 respectively (FIG. 2).

The variant is a circuit simplification if compared with the embodiment of FIG. 2, provided computing circuits operating at double rate are commercially available.

We claim:

1. Method of correcting burst errors on a low-bit-rate coded speech signal transmitted on radio-communication channels, said speech signal being subdivided into intervals, wherein said intervals being indicated by indices n+2, n+1, n, and n−1 and coded into sets of parameters, said errors causing a change in values of said parameters, comprising the steps of:

calculating at each of said intervals, a first distance value of distance between said parameters of intervals n and n−1;

comprising said first distance value with a threshold value;

calculating at each of said intervals, a second distance value of distance between said parameters of intervals n+1 and n+2 if said first distance value exceeds said threshold value and if said signal has a bad quality in interval n;

replacing said parameters received in interval n by first locally computed values if said second distance value is lower than said threshold value, or if said second distance value is greater than said threshold value and said signal has a good quality in interval n+1;

replacing said parameters received in intervals n and n+1 by second locally computed values if said second distance value is greater than said threshold value and said signal has a bad quality in interval n+1.

2. Method as defined in claim 1, wherein said parameters are reflection coefficients $K_i(n)$ $1 < i < M$, whereby M being number of said reflection coefficients, gain G(n), pitch P(n), characterized in that said said first and second distance values between said parameters consist of measurements of a first and respectively second values of spectral distance DS(n) among said reflection coefficients $K_i(n)$ of corresponding index.

3. Method as defined in claim 2, characterized in that said measurement of first value of spectral distance DS(n) is obtained by the following formula:

$$DS(n) = \frac{1}{10} \sum_{i=1}^{M} 20 \left| \log \frac{AR_i(n)}{AR_i(n-1)} \right|$$

where $$AR_i(n) = \frac{1 + K_i(n)}{1 - K_i(n)} \text{ for } 1 < i < M$$

and where $$AR_i(n-1) = \frac{1 + K_i(n-1)}{1 - K_i(n-1)} \text{ for } 1 < i < M$$

and in that said second value of spectral distance is obtained and where $$DS(n+2) = \frac{1}{10} \sum_{i=1}^{M} 20 \left| \log \frac{AR_i(n+2)}{AR_i(n-1)} \right|$$

where $$AR_i(n+2) = \frac{1 + K_i(n-2)}{1 - K_i(n+2)} \text{ for } 1 < i < M$$

and where

-continued
$$AR_i(n+1) = \frac{1 + K_i(n+1)}{1 - K_i(n+1)} \text{ for } 1 < i < M.$$

4. Method as defined in claim 2, characterized in that said first locally-computed values are given by the following expressions:

$$Ki(n) = \frac{K_i(n-1) + K_i(n+1)}{2}$$

$$G(n) = \frac{G(n-1) + G(n+1)}{2}$$

$$P(n) = \frac{P(n-1) + P(n+1)}{2}, \text{ if } P(n-1), P(n+1) \neq 0$$

$$P(n) = P(n-1), \text{ if } P(n-1) \neq 0, P(n+1) = 0$$

$$P(n) = P(n+1), \text{ if } P(n-1) = 0, P(n+1) \neq 0$$

$$P(n) = 0 \text{ if } P(n-1) = P(n+1) = 0$$

5. Method as defined in claim 2, characterized in that said first locally-computed values are given by the corresponding values of the preceding interval.

6. Method as defined in claim 2, characterized in that said first locally-computed values are given by the corresponding values of the subsequent interval.

7. Method as defined in claim 2, characterized in that said second locally-computed values are for interval n the corresponding values of interval n−1 and for interval n+1 those of interval n+2.

8. A device for correcting burst errors on a low-bit-rate coded speech signal transmitted on radio-communication channels, said speech signal being subdivided into intervals, wherein said intervals being indicated by indices n+2, n+1, n, and n−1 and coded into sets of parameters, said errors causing a change in values of said parameters, said device comprising:

a demodulator (DEM), a decoder (DEC) coupled to said demodulator and a speech synthesizer (SYNT), said demodulator emitting also a quality signal (SQD) indicative of reception quality, characterized in that between said decoder (DEC) and speech synthesizer (SYNT) the following means are inserted:

a first delay line with at least three delay elements (BF2, BF3, BF4) for said sets of parameters arriving from said decoder (DEC), switching means (MX2) being inserted between first of said delay elements (BF2) and second of said delay elements (BF3) delay elements for replacing said sets of parameters by locally generated parameters;

a first computing circuit (DS1, DS2) of said distance between said set of parameters, which, when activated by a first clock signal (CK2), computes a first distance value between corresponding parameters present at the input and at the output of said third of said delay elements (BF4), and a second distance value between the corresponding parameters present at the input and at the output of said first delay element (BF2);

a second delay line enabled by a second clock signal (CK1), and having at least three cascaded delay elements (DL1, DL2, DL3) for said quality signal (SQD) indicating reception quality coming from said demodulator (DEM);

a first logic circuit (P4) generating a first error signal (24) when the first distance value exceeds the distance threshold (SOG), and when the signal (22) at the output of said second delay line indicates a bad reception quality; and generating a second error signal (25) when the first and second distance values exceed the distance threshold (SOG) and the signals at the input and the output of the third element of the second delay line indicate a bad reception quality;

a second logic circuit (P1, P2, P3, P6, P7, FF1), which generates: enabling signals for all the elements of said first delay line (BF2, BF3, BF4) when a third clock signal (CK5) is active; when a fourth clock signal (CK4) is active, a further enabling signal for the first element (BF2) of the first delay line, if said second error signal (25) is present, and for the second element (BF3), if said first error signal (24) is present; a switching signal, for said switching means (MX2) which determines said substitution when said first error signal (24) and fourth clock signal (CK4) are present;

a second computing circuit (CLP) which, when activated by a fifth clock signal (CK3), calculates and supplies to said switching means (MX2) said locally-computed parameters on the basis of the parameter values present at the output of the first (BF2) and third (BF4) elements of the first delay line, and on the basis of the level of said second error signal (25);

a time-base (BT) which, on the basis of a synchronism signal supplied by said decoder (DEC), generates at each interval, in sequence, a pulse of said second (CK1), first (CK2), fifth (CK3), fourth (CK4), third (CK5) clock signals; said parameters present at the output of the second element (BF3) of said first delay being supplied to said speech synthesizer (SYNT) when the pulses of said third clock signal (CK5) are present.

9. Device according to claim 8, characterized in that said second computing circuit (GLP) comprises:

a mean value computing circuit (SOM, DIV) of corresponding parameters present at the outputs of said first (BF2) and third (BF4) elements of the first delay line, which circuit supplies on a first output (31) the results relating to said reflection coefficients $K_i(n)$ $1 < i < M$, whereby M being number of said reflection coefficients and gain G(n), and on a second output (32) the result relatng to the pitch P(n);

a third computing circuit (CMP3, CMP4, P10, ... P16) determining the pitch values P(n) on the basis of those present at the second output of said mean value computing circuit (SOM, DIV), and at the outputs of said first (BF2) and third (BF4) elements of the first delay line;

second switching means (MX3) controlled by said second error signal (25), supplying at the output, as values of said locally-computed parameters, those of the output of said third delay element (BF4) if said second error signal (25) is active, else those of the first output (31) of the mean-value computing circuit, and of the output of said third computing circuit.

10. Device according to claim 9, characterized in that said third computing circuit (CMP3, CMP4, P10 ... P16) supplies the value of pitch P(n) present at the second output (32) of said mean-value computing circuit, if signals present at the outputs of the first (BF2) and third (BF4) delay elements of the first delay line are different from zero; or supplies the output value of the first element (BF2) if different from zero, and if that of the output of the third delay element (BF4) is equal to zero; or supplies the value of the output of the third delay element (BF4) if different from zero, and if that of the output of the first delay element (BF2) is equal to zero; or supplies value zero if the outputs of the first and third delay element are zero.

11. Device as in claim 8, characterized in that said second computing circuit (GLP) consists of a first register which, when said first register receives a pulse of said fifth clock signal (CK3) supplies, as locally-computed parameters, those present at the output of said third delay element (BF4) of the first delay line.

12. Device according to claim 8, characterized in that said first computing circuit (DS1, DS2) comprises two equal computing units, the reflection coefficients present at the input and at the output of said third element (BF4) of the first delay line being transferred to the inputs of the first computing unit (DS1), while the reflection coefficients present at the input and at the output of said first element (BF2) of said first delay line are sent to the inputs of said second computing unit (DS2); the output of said first computing unit (DS1) being said first value of distance between parameters, while the outputs of the second computing unit (DS2) being said second value of distance, each of said computing units consisting basically of M equal sections $(AR_1, \ldots AR_M)$ one for each pair of reflection coefficients $K_i(n)$ of corresponding index, each of said sections basically comprising:

a third two-input multiplexer (MX4) receiving a pair of reflection coefficients which are supplied to the output in succession on the basis of a control signal (S1) applied to the control input;

a first (SM2) and second (SM3) adders which respectively add to and subtract from logic "1", reflection coefficient they receive from said third multiplexer (MX4) and supply the results to a first divider (DV2) which effects the division of said results;

a first circuit (LOG) computing the logarithm, expressed in decibel (dB), of the value supplied by said first divider (DV2);

a third adder (SM4) which subtracts from a first value received from said circuit computing the logarithm (LOG), through a first delay circuit (DL5), a second value directly received from said circuit (LOG) and supplies the result at the output of the respective section (AR), said first delay circuit (DL5) introducing a delay equal to that introduced by upstream circuits to effect their computations, said time being also that during which said third multiplexer (MX4) remains switched on each input;

each of said computing units (DS1, DS2) comprising in addition a first block (SMD) calculating the summation of the results emitted by each section, dividing said summation by 10, and emitting the result at the output of the relevant computing unit.

13. Device, as in claim 8, characterized in that said first computing circuit (DS1, DS2) of said distance among the parameters comprises a second M equal sections each receiving reflection coefficients $K_i(n)$ $1 < i < M$, of corresponding index present at the input and at the output of the first (BF2) and third (BF4) elements of said first delay line, each of said M sections basically comprising:

a fourth 4-input multiplexer receiving said reflection coefficients which are supplied at the output in succession on the basis of a control signal (S1) applied to the control input;

a fourth (SM2) and a fifth (SM3) adder which respectively add to and subtract from logic value "1" the reflection coefficient they receive from said fourth multiplexer and supply the results to a second divider which effects the division of said results;

a second circuit computing the logarithm, expressed in decibels (dB), of the value supplied by said second divider;

a sixth adder subtracting from a first value received from said second logarithm computing circuit, through a second delay circuit, a second value directly received from said circuit and supplies the result to the output of the respective section (AR), said second delay circuit introducing a delay equal to the time spent by the upstream circuits to perform the relevant computations, said time being also that during which multiplexer is switched on each input;

said first computing circuit (DS1, DS2) comprising in addition a second block calculating the summation of the results emitted by each section, divided by 10, and relevant both to reflection coefficients present at the input and output of said third delay element (BF4), emitting as a result said first value of distance among the parameters, and to the coefficients present at the input and output of said first delay element (BF2), emitting as a result said second value of distance among the parameters.

14. Device according to claim 8, characterized in that it further comprises a register (BF1), synchronized by said second clock signal (CK1) and placed at the input of said first delay line (BF2, BF3, BF4), said second register supplying the first element (BF2) of said first delay line with the set of parameters arriving from said decoder (DEC) when it receives a pulse of said second clock signal.

* * * * *